United States Patent [19]

Ebert et al.

[11] Patent Number: 4,946,927

[45] Date of Patent: Aug. 7, 1990

[54] PREPARATION OF AROMATIC POLYCARBONATES, AROMATIC POLYESTER CARBONATES AND AROMATIC POLYESTERS WITH ORGANIC PHASE COMPRISING MIXTURE OF HYDROCARBONS

[75] Inventors: Wolfgang Ebert; Rolf-Volker Meyer; Rolf Dhein; Udo Oels, all of Krefeld, Fed. Rep. of Germany

[73] Assignee: Bayer Aktiengesellschaft, Leverkusen, Fed. Rep. of Germany

[21] Appl. No.: 331,313

[22] Filed: Mar. 30, 1989

[30] Foreign Application Priority Data

Apr. 12, 1988 [DE] Fed. Rep. of Germany ....... 3812049

[51] Int. Cl.$^5$ .............................................. C08G 64/04
[52] U.S. Cl. ................................. 528/198; 528/176; 528/179; 528/196; 528/274
[58] Field of Search ............... 528/198, 196, 179, 176, 528/274

[56] References Cited

U.S. PATENT DOCUMENTS

| | | | |
|---|---|---|---|
| 3,028,365 | 4/1962 | Schnell et al. | 260/47 |
| 3,112,292 | 11/1963 | Bottenbruch et al. | 260/47 |
| 3,275,601 | 9/1966 | Schnell et al. | 260/47 |
| 3,530,049 | 9/1970 | Schermer et al. | 204/43 |
| 4,038,252 | 7/1977 | Vernaleken et al. | 260/47 |
| 4,252,939 | 2/1981 | Mori et al. | 528/171 |
| 4,334,053 | 6/1982 | Freitag et al. | 528/179 |
| 4,631,338 | 12/1986 | Meyer et al. | 528/483 |

FOREIGN PATENT DOCUMENTS

| | | |
|---|---|---|
| 958144 | 11/1974 | Canada . |
| 1173998 | 9/1984 | Canada . |
| 41-21472 | 12/1966 | Japan . |
| 1015393 | 12/1965 | United Kingdom . |

*Primary Examiner*—Harold D. Anderson
*Attorney, Agent, or Firm*—Joseph C. Gil; Aron Preis

[57] ABSTRACT

The present invention relates to a process for the preparation of aromatic polycarbonates, aromatic polyester carbonates and aromatic polyesters by the known two phase interface process, which is characterized in that the organic phase used is a mixture of aromatic hydrocarbons with alkanes and/or cycloalkanes.

7 Claims, No Drawings

PREPARATION OF AROMATIC POLYCARBONATES, AROMATIC POLYESTER CARBONATES AND AROMATIC POLYESTERS WITH ORGANIC PHASE COMPRISING MIXTURE OF HYDROCARBONS

This invention relates to a process for the preparation of aromatic polycarbonates, aromatic polyester carbonates and aromatic polyesters by the known two-phase interface process in the presence of an aqueous and an organic phase by the reaction of diphenols with phosgene and/or with aromatic dicarboxylic acid dihalides, optionally with the addition of monofunctional chain terminating agents and optionally with the addition of trifunctional or higher than trifunctional branching agents, optionally in the presence of catalysts and/or optionally in the presence of reducing agents, characterised in that the organic phase used is a mixture of from 5 to 95% by weight, preferably from 30 to 90% by weight, most preferably from 50 to 85% by weight, of aromatic hydrocarbons and from 95 to 5% by weight, preferably from 70 to 10% by weight, especially from 50 to 15% by weight, of alkanes and/or cycloalkanes.

The preparation of thermoplastic polycarbonates by the two-phase interface process is known (see, for example, U.S. Pat. Nos. 3,028,365 and 3,275,601). The organic phase used for this process may consist of petroleum hydrocarbons, ligroin, cyclohexane, methyl cyclohexane, benzene, toluene, xylene, etc. (see, for example, U.S. Pat. No. 3,028,365, column 2, lines 45 to 48 in conjunction with lines 32 to 35 of column 2 and the examples).

The mixtures of aromatic hydrocarbons with alkanes or cycloalkanes to be used according to the invention are not described in the said publications.

According to U.S. Pat. No. 3,112,292, which is directed towards the preparation of linear, crystallized polycarbonates, preparation by the phase interface process may be carried out in the presence of aromatic hydrocarbons such as benzene, toluene or xylene (column 2, line 46) but aliphatic hydrocarbons and cycloaliphatic hydrocarbons may be used to promote crystallization of the polycarbonate from its solutions (column 3, lines 18 to 24).

According to Japanese Patent Publication No. 21 472/66, the polycarbonate may be directly obtained in its solid form if the reaction with phosgene is carried out in the presence of optionally chlorinated aromatic hydrocarbons, surface active agents and aqueous alkali metal solutions.

According to U.S. Pat. No. 3,530,049, aromatic, aliphatic and cycloaliphatic hydrocarbons may be used for precipitating the polycarbonate from its solutions (column 6, lines 60 et seq.) while benzene and toluene may also form the organic phase for the preparation of polycarbonates by the phase interface process (column 5, lines 28 to 33).

In DE-OS No. 2 410 716 (LeA 15 514), it is recommended to use chlorobenzene as solvent for the preparation of the polycarbonates but temperatures above 70° C. must be maintained.

Lastly, it is known from DE-OS No. 3 429 960 (LeA 22 921) that polycarbonates may be isolated under mild conditions by treating the polycarbonate solutions with vapours of benzene or alkyl benzenes. It follows from this that benzene and alkyl benzenes have proved to be unsuitable in practice for use as the organic phase for phase interface polycondensation.

The diphasic interface process for the preparation of aromatic polyesters has been described in DE-OS No. 2 940 024 (LeA 19 932). The solvents mentioned there include dichloromethane, chloroform, tri- and tetrachloroethylene, tetrachloroethanes, chlorobenzenes, dichlorobenzenes and mixtures of these compounds (page 11, lines 6 to 12 of DE-OS).

The diphasic interface process for the preparation of aromatic polyester carbonates has been described in DE-OS No. 3 007 934 (LeA 20 203). The solvents used there are the same chlorine-containing solvents as those mentioned above (page 11, last paragraph of the DE-OS).

The phase interface process was therefore in practice generally carried out with the aid of chlorine-containing compounds as solvents, but this has certain disadvantages for the isolation of the thermoplastic polyarbonates so that special, elaborate measures are required (see, for example, DE-OS No. 34 29 960).

The process according to the invention, on the other hand, affords the advantage for the preparation of aromatic polyesters and polyester carbonates that it can be carried out in unusually high concentrations so that an improved volume/time yield can be obtained. The problem of completely removing the halogenated hydrocarbons is then not of major importance.

The aromatic hydrocarbons to be used according to the invention preferably contain from 7 to 15 carbon atoms and correspond in particular to Formula (I):

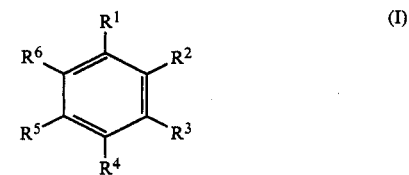

wherein
R$^1$ to R$^6$ denote, independently of one another, hydrogen or branched or unbranched C$_1$ to C$_{19}$ alkyl or phenyl or C$_7$ to C$_9$ alkaryl/aralkyl groups with the proviso that at least one of the groups R$^1$ to R$^6$ is no hydrogen; further, two groups denoted by R$^1$ to R$^6$ which are in the ortho position to one another may form an optionally substituted aromatic or cycloaliphatic condensed ring.

The following are examples of aromatic hydrocarbons: benzene, toluene, ethylbenzene, 1,2-dimethyl benzene, 1,3-dimethyl benzene, 1,4-dimethyl benzene, 2-, 3- and 4-ethyl toluene, cumene, n-propyl benzene, 1,2,3-trimethyl benzene, 1,2,4-trimethyl benzene, 1,3,5-trimethyl benzene, i/n/sec./tert.-butyl benzene, o/m/p-cymene, 1,2-, 1,3- and 1,4-diethyl benzene, 2-/3-/4-methyl-n/i-propyl benzene, 1,2,3,4-tetramethyl benzene, 1,2,3,5-tetramethyl benzene, 1,2,4,5-tetramethyl benzene, n-amyl benzene, isoamyl benzene, pentamethyl benzene, 1-/2-methyl naphthalene, 1-/2-ethyl naphthalene, 1,2-/1,4-/1,6-/1,7-dimethyl naphthalene, hexamethyl benzene, hexyl benzene, 1,3,5-triethyl benzene, 1,2,5-trimethyl naphthalene, 1,2,7-trimethyl naphthalene and 1,3,5-triisopropyl benzene, tetraline, ditolyl and diphenyl. The following are preferred: toluene, ethyl benzene, o/m/p-xylene, 1,3,5-trimethyl benzene and 1,3,5-triisopropyl benzene.

The optionally branched alkanes to be used according to the invention have from 5 to 20 carbon atoms, preferably 5 to 12 carbon atoms.

Examples of alkanes include n/i-pentane, n/i-hexane, n/i-heptane, n/i-octane and mixtures thereof such as are obtained, for example, from the distillation of petroleum hydrocarbon fractions.

The cycloalkanes to be used according to the invention have from 5 to 20 carbon atoms, preferably 5 to 12 carbon atoms.

The following are examples of cycloalkanes: cyclopentane, cyclohexane, ethyl cyclopentane, methyl cyclohexane, ethyl cyclohexane, tetraline and decaline, cyclooctane and cyclododecane.

Any combinations of the above mentioned aromatic hydrocarbons may be used with the above mentioned alkanes and/or cycloalkanes. The following are examples of suitable combinations:

Toluene/pentane, toluene/hexane, toluene/heptane, toluene/i/n-octane, toluene/cyclopentane, toluene/cyclohexane, toluene/petroleum ether, toluene/petroleum hydrocarbons, xylene/pentane, xylene/hexane, xylene/heptane, xylene/i/n-octane, xylene/cyclopentane, xylene/cyclohexane, xylene/petroleum ether, xylene/petroleum hydrocarbons, mesitylene/pentane, mesitylene/hexane and mesitylene/i/n-octane.

The following are examples of preferred combinations: toluene/pentane, toluene/i-octane, toluene/petroleum ether, toluene/petroleum hydrocarbons, toluene/cyclohexane, xylene/i-octane, xylene/petroleum ether, xylene/petroleum hydrocarbons and xylene/cyclohexane.

The quantity of organic phase for carrying out the process according to the invention is from 300 ml to 8000 ml per mol of diphenol, preferably from 350 ml to 5000 ml per mol of diphenol.

The reaction temperatures for the phase interface process are in the range of from 0° C. to 100° C., in particular from 5° C. to 50° C. and especially between 5° C. and 40° C. but the boiling point of the reaction mixtures must, of course, be taken into account and it may be necessary to employ a slight excess pressure.

The reaction times for the phase interface process, including the after-condensation time, are from 15 minutes to 150 minutes.

The reaction according to the invention takes place at pressures of from 1 atm to 6 atm, preferably at normal pressure.

The pH of the aqueous phase of the two-phase interface process according to the invention is in the range of from 9 to 14, preferably from 10 to 14. The quantity of aqueous phase must be calculated to enable emulsions to be obtained under the chosen conditions of stirring.

Suitable alkaline materials for the aqueous phase include those conventionally employed, such as aqueous solutions of alklai metal compounds or alkaline earth metal compounds, preferably aqueous alkali metal compounds, especially aqueous NaOH or aqueous KOH.

The diphenols used in the process according to the invention may be any diphenols not containing any substituents which are reactive under the reaction conditions of the phase interface process according to the invention. This means that apart from the two phenolic OH groups, the diphenols may only contain substances which are inert under the reaction conditions of the phase interface process according to the invention, such as, for example, aromatically bound chlorine, bromine or alkyl. Preferred diphenols are bis-(hydroxyaryl)- compounds, especially those having from 12 to 21 carbon-atoms.

The following are examples of diphenols: dihyroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-hydroxyphenyl)-ketones, bis-(hydroxyphenyl)-sulphoxides, bis-(hydroxyphenyl)-sulphones and α,α'-bis-(hydroxyphenyl)-diisopropyl benzenes, 4,4'-dihydroxydiphenyl, 4,4'-dihydroxy-3,3',5,5'-tetramethyldiphenyl, 4,4'-dihydroxy-3,3',5,5'-tetrachlorodiphenyl, bis-(4-hydroxyphenyl)-methane, bis-(4-hydroxy-3,5-dimethylphenyl)-methane, bis-(4-hydroxy-3,5-dichlorophenyl)-methane, 2,2-bis-(4-hydroxyphenyl)-propane, 2,2-bis-(4-hydroxy-3,5-dimethylphenyl-propane, 2,2-bis-(4-hydroxy-3,5-dichlorophenyl)propane, 1,1-bis-(4-hydroxyphenyl)-cyclohexane, 1,1-bis-(4-hydroxy-3,5-dimethylphenyl)-cyclohexane, 1,1-bis-(4-hydroxy-3,5-dichlorophenyl)-cyclohexane, bis-(4-hydroxyphenyl)sulphone, bis-(4-hydroxy-3,5-dichlorophenyl)-sulphone, bis-(4-hydroxy-3,5-dimethylphenyl)-sulphone, bis-(4-hydroxyphenyl)-sulphide, bis-(4-hydroxy-3,5-dimethylphenyl)-sulphide, bis-(4-hydroxy-3,5-dichlorophenyl)-sulphide, bis-(4-hydroxyphenyl)-oxide bis-(4-hydroxy-3,5-dimethylphenyl)-oxide, bis-(4-hydroxyphenyl)-ketone and bis-(4-hydroxy-3,5-dimethylphenyl)-ketone.

These diphenols are either known in the literature or obtainable by processes known in the literature.

The following are preferred diphenols: 2,2-bis-(4-hydroxyphenyl)-propane, 1,1-bis-(4-hydroxyphenyl)-cyclohexane, bis-(4-hydroxyphenyl)-sulphide, bis-(4hydroxyphenyl)-sulphone and 2,2-bis-(4-hydroxy-3,5-dimethylphenyl)-propane.

The diphenols may be used singly or as a mixture of two or more diphenols.

Aromatic dicarboxylic acid dichlorides used according to the invention preferably have from 8 to 18 carbon atoms and preferably correspond to the following Formula (IV):

wherein
Ar stands for an aromatic, optionally substituted group containing 6 to 14 carbon atoms.

Examples of suitable aromatic dicarboxylic acid dihalides include terephthalic acid dichloride, isophthalic dichloride, phthalic acid dichloride and naphthalene-1,2-, -1,4-, -1,5- or -1,8-dicarboxylic acid dichloride.

Terephthalic acid dichloride, isophthalic acid dichloride and mixtures thereof are preferred.

The chain breaking agents used according to the invention may be monophenols and chlorides of monobasic acids, especially of monocarboxylic acids.

The following are examples of suitable monophenols: phenol, p-tert.-butyl phenol, o-cresol, m-cresol, p-cresol, 2-/3-/4-ethyl phenol, cumene,

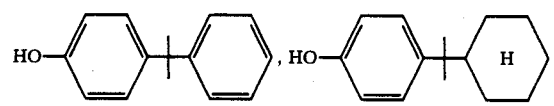

p-nonyl phenol, p-isooctyl phenol, p-chlorophenol, p-bromophenol, β-naphthol and α-naphthol.

Suitable acid chlorides include e.g. acetyl chloride, benzoyl chloride, naphthoic acid chloride and the chloroformates of the above mentioned phenols.

The quantities of chain breaking agents to be used are from 0.2 to 10.0 mol %, preferably from 1.0 to 6.5 mol %, based on the number of mols of diphenols used.

Monophenols may be used alone or acid chlorides alone or both monophenols and acid chlorides may be used, but in that case they are introduced successively.

Branching agents used for the process according to the invention may be, for example, polyhydroxyl compounds having three or more than three phenolic hydroxyl groups.

The branching components used may be the compounds described in German Offenlegungsschriften Nos. 1 570 533, 15 95 762, 21 16 974, 21 13 347 and 25 090 924, in British Patent Specification No. 1 079 821 and in U.S. Pat. No. 3,544,514.

The following are some examples of suitable compounds containing three or more than three phenolic hydroxyl groups: phloroglucinol, 4,6-dimethyl-2,4,6-tri-(4-hydroxyphenyl)-heptene-2; 4,6-dimethyl-2,4,6-tri-(4-hydroxyphenyl)-heptane, 1,3,5-tri-(4-hydroxyphenyl)-benzene; 1,1,1-tri-(4-hydroxyphenyl)-ethane; tri-(4-hydroxyphenyl)-phenyl methane; 2,2-bis-[4,4-bis-(4-hydroxyphenyl)-cyclohexyl]-propane; 2,4-bis-(hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane and 1,4-bis-(4,4''-dihydroxytriphenyl-methyl)-benzene. The following are further examples of suitable trifunctional compounds: trimesic acid trichloride, cyanuric chloride, 3,3-bis-(4-hydroxyphenyl)-2-oxo-2,3-dihydroindole and 3,3-bis-(4-hydroxy-3-methylphenyl)-2-oxo-2,3-dihydroindole.

The quantity of branching agent to be used ranges from 0.05 to 3.0 mol %, preferably from 0.1 to 1.5 mol %, based on the quantity of diphenols used.

In the process according to the invention, a sufficiently high molecular weight may be obtained without the use of catalysts but catalysts accelerate the reaction in the case of some diphenols.

Quaternary ammonium salts, quaternary phosphonium salts and tertiary amines are suitable catalysts for the process according to the invention.

The quantity of catalyst varies from 0.2 to 10 mol % according to the nature of the diphenols used. In the case of, for example, tetrasubstituted diphenols, it may range from 0.5 to 15 mol %, based on the total quantity of diphenols.

Either single catalysts or mixtures of various catalysts may be used.

Suitable quaternary ammonium salts for the process according to the invention have from 4 to 50 carbon atoms and 1 to 3 nitrogen atoms as described e.g. by E. V. Dehmlow and S. S. Dehmlow in "Phase Transfer Catalysis", published by Verlag Chemie, 1980, Weinheim, or as described in U.S. Pat. No. 3,275,601.

Quaternary phosphonium salts suitable for the process according to the invention have from 4 to 50 carbon atoms.

The following are examples: triphenylbenzylphosphonium bromide/chloride, tetraphenylphosphonium bromide/chloride, tributylmethylphosphonium bromide/chloride and tetrabutylphosphonium bromide/chloride.

The following are preferred ammonium and phosphonium compounds: tetraethylammonium chloride/bromide, tetrabutylammonium chloride/bromide, triethylbenzylammonium chloride/bromide, tricetylmethylammonium chloride/bromide, tricaprylmethylammonium chloride/bromide, triphenylbenzylphosphonium chloride/bromide, tributylmethylphosphonium chloride/bromide and mixtures of these compounds.

Tertiary amines suitable for the process according to the invention may be either cyclic or open chained. Aliphatic tertiary amines are preferred, for example those having one or two nitrogen atoms and 3 to 24 carbon atoms. The following amines are examples:

Trimethylamine, triethylamine, tributylamine, trihexylamine, dimethylbenzylamine, triethylene diamine, tetramethylethylene diamine, permethyldiethylene triamine, N,N-dimethylcyclohexylamine, N-ethylpiperidine, 1,4-dimethylpiperazine, 4-methyl-morpholine, 4,4'-(1,2-ethanediyl)-bis-morpholine and 1,2-diazabicyclo-(2,2,2)-octane.

The catalysts are added in a known manner, either before, during or after phosgenation or before, during or after addition of the acid chloride.

Sodium sulphite and sodium borohydride are examples of suitable reducing agents. The reducing agents are used in quantities of from 0.25 to 2 mol %, based on the mols of diphenols.

In the process according to the invention, $COBr_2$ or bis-halogen formates of the diphenols may be used instead of phosgene; for example, the bischloroformates of 2,2-bis-(4-hydroxyphenyl)-propane or of 2,2-bis-(4-hydroxy-3,5-dimethylphenyl)-propane or the bischloroformates of bis-diphenol esters of aromatic dicarboxylic acids.

Bishalogen formates of aromatic oligo carbonates and bis-acid-bis-halides of aromatic oligo esters of aromatic dicarboxylic acids and diphenols may also be used.

The quantity of phosgene required for carrying out the process according to the invention, based on the quantity of phenolic OH, may be from 100 to 200 mol % for the synthesis of aromatic polycarbonates, preferably from 110 to 150 mol %.

The same applies to the use of bishalogen formates.

The quantity of dicarboxylic acid dihalide required for carrying out the process according to the invention, based on the quantity of phenolic OH, may be from 98 to 103 mol % for the synthesis of aromatic polyesters, preferably from 99 to 102 mol %.

The same applies to the use of bis-acid bis-halides of aromatic oligo esters.

The ratio of carbonate to dicarboxylic diester structures used for the synthesis according to the invention of aromatic polyester carbonates may be from 1:25 to 25:1 and is preferably from 1:20 to 10:1 of-carbonate:-dicarboxylic acid diester.

The reaction of the dicarboxylic acid dichlorides is preferably carried out before phosgenation and the phosgene is used in an excess of from 10 to 50 mol %, based on the stochiometric quantity.

The process according to the invention generally results in a heterogeneous mixture but mixing may be carried out in an ordinary stirrer vessel or on kneaders, for example of the type used in the rubber industry. Working up of the polycarbonates, polyester carbonates or polyesters may be carried out by dissolving these polycarbonates in an easily removable solvent, for example after removal of the liquid phase, and then washing and isolating in the usual manner.

Alternatively, the polycondensates may be worked up after removal of the organic and inorganic phase by directly washing the swelled reaction products with acids such as phosphoric acid or hydrochloric acid and water, preferably on kneaders, followed by drying of the washed products.

The organic phase may also be distilled off by water steam distillation.

The thermoplastic aromatic polycarbonates obtainable by the process according to the invention may have average values for the weight average molecular weights of from 8000 to 50,000 (determined by gel permeation chromatography).

They may be stabilized, coloured, filled, pigmented, flame proofed or modified with other polymers in the conventional manner.

The technical fields of application of the thermoplastic polycarbonates obtainable by the process according to the invention are known. For example, these products may be used in the electrical sector or in the motor car industry.

The thermoplastic aromatic polyester carbonates obtainable by the process according to the invention may have average values for weight average molecular weights of from 8000 to 50,000 (determined by gel permeation chromatography).

They may be stabilized, coloured, filled, pigmented, flame proofed or modified with other polymers in the conventional manner.

The fields of application of the thermoplastic polyester carbonates obtainable by the process according to the invention are known. For example, they may be used in the electrical sector or in the motor car industry.

The thermoplastic aromatic polyesters obtainable by the process according to the invention may have average values for the weight average molecular weights of from 8000 to 50,000 (determined by gel permeation chromatography).

They may be stabilized, coloured, filled, pigmented, flame proofed or modified with other polymers in the conventional manner.

The technical fields of application of the thermoplastic polyesters obtainable by the process according to the invention are known. For example, these products may be used in the electrical sector or in the motor car industry.

EXAMPLES

EXAMPLE 1

125 ml of toluene, 125 ml of i-octane, 400 ml of $H_2O$, 20 g (0.5 mol) of sodium hydroxide solution and 22.8 g (0.1 mol) of 2,2-bis-(4-hydroxyphenyl)-propane are introduced as a diphasic system into a round bottomed flask equipped with stirrer, thermometer, condensor and inlet tube and the reaction mixture is cooled to 10° C. and kept at this temperature for the duration of the experiment. 14.85 g (0.15 mol) of phosgene are then introduced within 30'. After-condensation is then carried out on a laboratory kneader for 2 hours.

The residues of solvent and the inorganic phase are separated off. The swelled polymer is then washed on the kneader, once with dilute phosphoric acid and 6 times with distilled water, and is then dried in a vacuum drying cupboard at 80° C. for 10 hours.

Yield: 22.6 g.
$\eta_{rel}=1.387$ after 1 hours after-condensation.
$\eta_{rel}=1.418$ after 2 hours after-condensation.

EXAMPLE 2

The same as Example 1 but using 75 ml of toluene and 75 ml of i-octane at 20° C.
Yield: 22.7 g.
$\eta_{rel}=1.369$ after 2 hours after-condensation.

EXAMPLE 3

The same as Example 1 but in this case 1.0 mol % of N-ethylpiperidine is added as catalyst after the introduction of phosgene. The experiment was carried out at 20° C.
Yield: 22.8 g.
$\eta_{rel}=1.401$ after 2 hours after-condensation.

EXAMPLE 4

The same as Example 3 but in addition 2.0 mol % of p-tert.-butylphenol are introduced with the diphasic system as chain breaking agent.
Yield: 23.5 g.
$\eta_{rel}=1.220$ after 2 hours after-condensation.

EXAMPLE 5

The same as Example 1 but with the addition of 0.1 mol % of tetrabutylammonium bromide as catalyst and 2 mol % of p-tert.-butylphenol as chain breaking agent to the diphasic system introduced into the flask.
Yield: 21.6 g.
$\eta_{rel}=1.302$ after 2 hours after-condensation.

EXAMPLE 6

350 ml of toluene and 100 ml of i-octane are introduced into a round bottomed flask together with 500 ml of water, 10 g (0.25 mol) of sodium hydroxide, 22.8 g (0.1 mol) of bisphenol A and 0.75 g (5 mol %) of p-tert.-butylphenol at 10° C. 20.7 g (0.102 mol) of a 1:1 mixture of terephthalic and isophthalic acid dichloride dissolved in 50 ml of toluene are introduced dropwise with stirring over a period of 15 minutes. After-condensation is then left to continue for 1 hour at room temperature. The product is worked up as in Example 1.
Yield: 27.6 g, $\gamma_{rel}=1.306$.

EXAMPLE 7

175 ml of toluene, 50 ml of i-octane and 61.3 g (0.302 mol) of a 1:1 mixture of terephthalic and isophthalic acid dichloride dissolved in 150 ml of toluene are introduced into a laboratory kneader. 67.4 g (0.3 mol) of bisphenol A, 0.9 g (2 mol %) of p-tert.-butylphenol and 26 g (0.65 mol) of sodium hydroxide dissolved in 400 ml of $H_2O$ are introduced dropwise in 15 minutes. 1 mol % of N-ethylpiperidine is then added and after-condensation is carried out at room temperature for 30 minutes. The precipitated polymer is dissolved in methylene chloride and washed with dilute phosphoric acid (once) and water (6 times). The product is then precipitated in methanol and dried in a vacuum at 80° C. for 10 hours.
Yield: 105.5 g, $\gamma_{rel}=1.234$.

We claim:

1. A process for the preparation of aromatic polycarbonates, aromatic polyester carbonates and aromatic polyesters by the known two phase interface process in the presence of an aqueous and an organic phase by the reaction of diphenols with at least one member selected from the group consisting of phosgene and aromatic dicarboxylic acid dihalides characterized in that the organic phase comprise a mixture of from 5 to 95% by weight of aromatic hydrocarbons and from 95 to 5% by weight of at least one member selected from the group consisting of alkane and cycloalkane.

2. A process according to claim 1, characterized in that the organic phase comprise from 30 to 90% by weight of aromatic hydrocarbons and from 70 to 10% by weight of at least one member selected from the group consisting of alkane and cycloalkane.

3. A process according to claim 1, characterized in that the organic phase comprise from 50 to 85% by weight of aromatic hydrocarbons and from 50 to 15% by weight of at least one member selected from the group consisting of alkane and cycloalkane.

4. The process of claim 1 wherein said reaction further comprise adding monofunctional chain terminating agents.

5. The process of claim 1 wherein said reaction further comprise trifunctional or higher than trifunctional branching agents.

6. The process of claim 1 wherein said reaction is carried out in the presence of a catalyst.

7. The process of claim 1 wherein said reaction is carried out in the presence of a reducing agent.

* * * * *